(12) United States Patent
Moulana et al.

(10) Patent No.: US 8,751,480 B1
(45) Date of Patent: Jun. 10, 2014

(54) VIRTUAL ARRAYS IN AN ARRAY-BASED LANGUAGE

(75) Inventors: Nausheen B. Moulana, Southborough, MA (US); Vadim Teverovsky, Acton, MA (US); Steven L. Eddins, Milford, MA (US)

(73) Assignee: The MathWorks, Inc., Natick, MA (US)

( * ) Notice: Subject to any disclaimer, the term of this patent is extended or adjusted under 35 U.S.C. 154(b) by 878 days.

(21) Appl. No.: 12/363,236

(22) Filed: Jan. 30, 2009

Related U.S. Application Data

(60) Provisional application No. 61/006,786, filed on Jan. 31, 2008.

(51) Int. Cl.
*G06F 7/00* (2006.01)
*G06F 17/30* (2006.01)

(52) U.S. Cl.
USPC ............................................. 707/711

(58) Field of Classification Search
USPC ............................................. 707/711
See application file for complete search history.

(56) References Cited

U.S. PATENT DOCUMENTS

| 7,092,967 | B1 * | 8/2006 | Pannala et al. ............. 1/1 |
| 7,574,336 | B1 * | 8/2009 | Jackson et al. ............ 703/2 |
| 7,620,620 | B1 * | 11/2009 | Sedlar ....................... 1/1 |
| 2005/0123209 | A1 * | 6/2005 | Kitora et al. ........... 382/243 |

OTHER PUBLICATIONS

Using MATLAB, Version 6, The MathWorks Inc., © 2001, pp. 3-2 to 3-13, 5-2 to 5-13, 6-2 to 6-15, http://courses.washington.edu/css485/using_ml.pdf.*

* cited by examiner

*Primary Examiner* — Jacob F. Bétit
*Assistant Examiner* — Christy Lin
(74) *Attorney, Agent, or Firm* — Venable LLP; Michael A. Sartori; Todd R. Farnsworth

(57) ABSTRACT

A generalized input/output application programming interface (API) may provide an interface to file related operations. As a result of using this API, users of the array-based programming language may be able to manipulate stored data as though the data were a virtual array loaded into memory. Users do not need to memorize a different API in order to access data which may be stored in different file or data formats. In addition, using this API simplifies the task of working with large data sets by giving users seamless access to the sections of data they want to operate on when the entire data is too large to be loaded into memory.

26 Claims, 8 Drawing Sheets

```
421 classdef Formatter < handle
422     properties
        end
428     methods(Abstract = true)
430         Rewind(obj, FileIdentifier)
432         Close(obj, FileIdentifier)
434         FileIdentifier = Open(obj, filename);
436         data = GetRegion (obj, FileIdentifier,
rowId1, columnId1, rowId2, columnId2);
438         data = GetValue(obj, FileIdentifier, rowId,
columnId);
440         SetRegion(obj, data, FileIdentifier, rowId1,
columnId1, rowId2, columnId2)
442         SetValue(obj, data, FileIdentifier, rowId,
columnId)
    end
end
```

FIG. 4A

```
441 UniformBinaryFormatter(rowSize, precision)
442     properties
443         RowSize
444         Precision % A GetValue function implemented as follows:
445 function out = GetValue(obj, FileIdentifier,
rowId, columnId)
        status=fseek(FileIdentifier, (rowId-
            1)*obj.RowSize+(columnId-
            1)*obj.ElementSize, -1);
    if (status <0)
        error('MATLAB:BinaryFormatter:OutOfBounds',
'Bounds exceeded.');
    end
    out = fread(FileIdentifier, 1, obj.Precision);
...
```

FIG. 4B

```
501 classdef VArray < handle
502 properties
504    Filename;
    end
506    properties(SetAccess=private, Hidden=true)
       FileId;
    end
508    methods
510       obj = VArray(filename, formatter);
    end
512    methods(Access = 'public', Hidden = true)
514       output = subsref(obj, S);
516       output = subsasgn(obj, S);
518       delete(obj)
    end
  end
```

FIG. 5

VIRTUAL ARRAYS IN AN ARRAY-BASED LANGUAGE

BACKGROUND OF THE INVENTION

Programmers routinely need to write sections of software code dealing with data manipulation. Often, that data comes from a file, a database, or any other data storage and specialized code may be needed to access the appropriate data storage. A language may provide tools for opening, reading and/or writing to different data storage formats. Typically, such tools include commands for opening a file, reading all data from the file, and/or writing new data to the file. Once the data from the file has been read into a data structure, a programmer typically has to specify commands for extracting the relevant portions of the data. Such extraction may require knowledge of the particular file format and/or organization of the data within the file.

BRIEF DESCRIPTION OF THE DRAWINGS

The foregoing and other features will be apparent from the following, more particular description of exemplary embodiments, as illustrated in the accompanying drawings wherein like reference numbers generally indicate identical, functionally similar, and/or structurally similar elements.

FIG. 4A depicts an exemplary definition of a formatter object;

FIG. 4B depicts an exemplary specific formatter object definition;

FIG. 5 depicts an exemplary definition of a virtual array object;

DEFINITIONS

Figure 1:
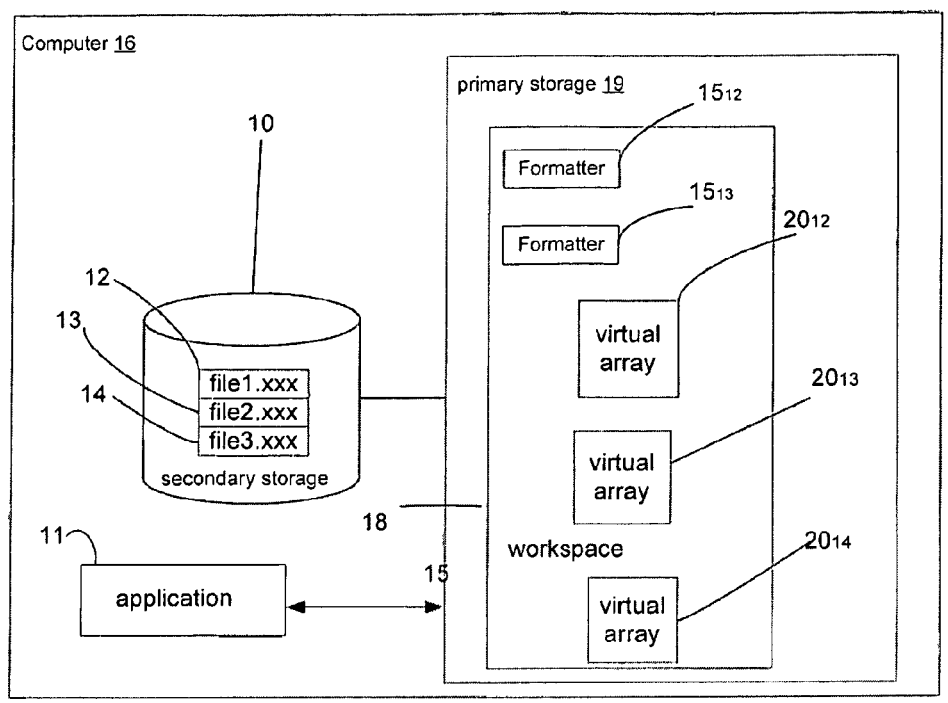
FIG. 1 depicts an exemplary system according to an embodiment.

In describing the invention, the following definitions are applicable throughout (including above).

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system-on-chip (SoC); a multiprocessor system-on-chip (MPSoC); a programmable logic controller (PLC); a graphics processing unit (GPU); an optical computer; and an apparatus that may accept data, may process data in accordance with one or more stored software programs, may generate results, and typically may include input, output, storage, arithmetic, logic, and control units.

"Software" may refer to prescribed rules to operate a computer or a portion of a computer. Examples of software may include: code segments; instructions; applets; pre-compiled code; compiled code; interpreted code; computer programs; machine code; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices (e.g., gateways, routers, switches, firewalls, address translators, etc.) that may be connected by communication facilities. A network may involve permanent connections such as cables or temporary connections such as those that may be made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); a metropolitan area network (MAN); a body area network (BAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

DETAILED DESCRIPTION OF EMBODIMENTS

There exists a multitude of file formats used for storing data in various fields and applications. The formats may be generic or industry or company-specific; they may be available for public use or restricted via any number of encryption and/or anti-tampering means. Data stored in the formats may include data received from experiments, either in-situ or in-vitro, data for simulation or modeling results, data for tests, data for statistical analysis, etc. Such data may be relevant to a multitude of industries or real world applications, from financial information, to airspace-related data, to biological or chemical data, etc. The data may be stored in more than one file, such that a single dataset may be spread among more than one file, database and/or other storage structures.

In many cases, it may be inconvenient to store the whole dataset in memory, whether for reasons of speed or conserving memory space, or other considerations, as determined by one of skill in the art. In such cases, it may be useful to be able to access some portions of the dataset without loading the whole dataset in memory. Even when a dataset is loaded into memory in its entirety, accessing it may require knowing the specific details of a particular file format or data format or layout of the data stored there. As such, a programmer creating a program for accessing such a dataset may need to know the specific details of the data format and write instructions targeting that format. If the format lends itself to being stored in indexed data structures, the programmer may need to specify the mapping between the data in the dataset and the intended indexed data structures. While such format-specific instructions are widely used, it may be more efficient if, instead of needing to encode the data, there was a mechanism or an application programming interface (API) that could be used for indexing into the data.

One embodiment disclosed herein facilitates data access through indexing into a dataset in secondary storage using an API. The API may allow for creating, reading and/or modifying the dataset using indexing instructions into the dataset. For example, the API may be used to create a data structure in memory corresponding to the dataset stored on disk. The API may allow indexing into the dataset through the use of the data structure stored in memory.

The API for indexing into the dataset may be similar to an array access API supported by a programming language. For example, the programming language may be an object oriented programming language. The programming language may be one or a combination of: FORTRAN 90, GNU Octave, C, C++, Java, Perl, NumPy, Visual Basic, or any other programming language. The programming language may be an array-based language, such as, for example, the language of the MATLAB© computing environment. It may also be a language, a subset of which is executable in the MATLAB© computing environment.

Data stored in the data structure, if any, need not mirror the data stored in the dataset. For example, data stored in the data structure may be a subset of the data stored in the dataset. In an alternative embodiment, no data may be stored in the data structure, and it may be used only as a way to access data in the dataset. In yet another embodiment, data access may be delayed relative to the execution of instructions accessing the data in the dataset. In yet another embodiment, additional schemes for accessing data on disk may be employed in order to facilitate the data access.

Exemplary embodiments are discussed in detail below. While specific exemplary embodiments are discussed, it should be understood that this is done for illustration purposes only. A person skilled in the relevant art will recognize that other components and configurations may be used without parting from the spirit and scope of the invention.

A traditional approach to supporting different file formats and data representations may require a user to understand and remember which function in the programming language is applicable to the user's particular situation, rather than allowing the user to focus on the task of getting the data and using the data. With the growing number of file formats and data representations, users may be daunted by the great number of functions needed to access their data.

Additionally, the amounts of data that are used in computing applications are becoming increasingly large. It is becoming more common for large amounts of data to be required for operations. Memory or performance limitations may preclude loading the entire dataset into the memory of an application. In many cases, users do not actually need to access all of the data, but rather relatively small selected portions.

In an embodiment, users can access data or portions of data located in a secondary storage through a data structure in memory. The secondary storage may be a file on disk, a database, one or more sections of data storage at a remote location, etc. The data structure may be used to manipulate all or portions of the data it refers to as if the data is readily available in memory, regardless of whether the data has in fact been loaded in memory. The data structure and its corresponding application programming interface (API) may provide a convenient way for managing data accesses, without requiring that all of the data be loaded in memory. The data structure API may also provide users with a way to access stored data without having to know or rely on specifics of a particular storage format. The API may be styled so as to be familiar to users and may allow indexing into data, regardless of whether data has been loaded into memory already.

The data structure may be an object, an array, a function, or any other data structure that is capable of being manipulated and provides a way for users to indicate what regions of underlying data should be accessed, as deemed appropriate by one of skill in the art. The data structure may perform transformative steps to transform data into a format appropriate for indexing into and/or a format convenient for data access. The API for accessing the data structure may be one that is already familiar to users from using other programming language constructs, or it may be specifically designed for providing access to memory in storage. In one embodiment, the API for accessing the data structure is similar to the API for manipulating arrays and/or portions of array data. For example, the user may use the same syntax for accessing data in storage through a data structure as they would to access data in an array. In this embodiment, the data structure may be referred to as a "virtual array." A virtual array may also be used as a mechanism for treating a data file as a virtual workspace. Selected data subsets in a secondary storage may be accessed and modified via the corresponding data structure in memory.

A virtual array may be an instance of an object and/or a data structure in the primary storage of the computer that represents data stored in the secondary storage of the computer. Primary storage may refer to data stored in the main general purpose memory of the computer to which a microprocessor(s), main processor(s), co-processor(s), or the like of the computer have direct access. Examples of a primary storage may include a microprocessor memory, a random access memory (RAM), a virtual memory, and the like. Secondary storage may refer to memory other than primary storage. Some examples of a secondary storage may include, for example, optical disc, hard disk, floppy disk, file server across a network and the like. For example, a virtual array may be a data structure in virtual memory that represents data stored on a hard disk.

A virtual array may be used in user software code in place where data accesses may be needed. In an embodiment, the actual data may be loaded only when the data is needed, or only portions of data to which a particular access refers may be loaded, instead of loading the whole file. In alternative embodiments, only portions of data, including accessed data, are loaded. In yet another embodiment, access to data on disk may be delayed and/or staggered, and/or portions of data may be loaded into cache memory, etc. In yet another embodiment, all data may be loaded at the time of the virtual creation or soon thereafter, and the virtual array may be used as a convenient interface for accessing and indexing into the data.

An interface for virtual arrays or other data-access data structures may be provided in a computing environment. A computing environment may be a textual and/or graphical computing environment. Exemplary embodiments may exist as part of a textual technical computing environment such as MATLAB® by The MathWorks, Inc. of Natick, Mass., MATHEMATICA® by Wolfram Research, or Comsol by Comsol, Inc. The techniques described herein may be embodied in functional components of such a technical computing environment, such as, for example, in a function, a model, a class, or other program element. Exemplary embodiments may exist as part of a technical computing environment that has graphical models, such as SIMULINK® and STATE-FLOW® by The MathWorks, Inc. of Natick, Mass., LABVIEW™ by National Instruments Corporation, or Unified Modeling Language (UML) environment.

In an embodiment, there may be a formatter object and/or a function aiding data access and/or transformation. The formatter object may provide methods that facilitate indexing into the underlying data and may act as an intermediary between the programming language API and the storage format. The formatter object may access the underlying data using a data access API appropriate for particular data/file formats. A common API exists between the virtual array and the formatter which defines the translation between the user-facing API and the implementation of the formatter. Specific implementations of a formatter may be provided by third parties or generated by the same party as the one creating and/or providing the applications accessing the data. All such implementations may implement the common API.

FIG. 1 illustrates an example of a system according to an exemplary embodiment. The system may include a secondary storage 10, that can be, for example, a data storage. Secondary storage 10 may be part of computer 16 (as shown) or external to computer 16 (not shown). Secondary storage 10, for example, may be optical disc, hard disk, floppy disk, file server across a network and the like. The data in secondary storage 10 may typically be arranged in data sets, such as, for example, files 12-14. Data having multiple data set types, for example, different file types and file formats may be stored in the secondary storage 10. The different file types may include, for example, binary and text files, flat and hierarchical data layouts, and proprietary and industry standard formats. The different file formats may include, for example, GIF, JPEG, TIFF, PDF, HDF, HTML, comma separated value, XML, binary MATLAB® format by The MathWorks, Inc. of Natick, Mass., etc.

Files 12-14 may be stored as different data set types, as indicated, for example, by the file name extension (e.g., .xls, .jpg, or .avi). Although only three files are illustrated in FIG. 1, the secondary storage 10 may include, generally, one or more files.

An application 11 running on computer 16 may need access to the data stored in the data storage 10. For example, application 11 may read, write, or perform operations, such as arithmetic operations, on the data stored in the data storage 10. In order to enable use of the data stored in data storage 10 by computer 16, the data from the data storage 10 may be read into a workspace 18 so that the data may be manipulated by the application 11 of the computer 16. The workspace 18 may be a computing environment as described above.

There may be one or more formatter 15 objects and/or procedures defined in the workspace. A formatter 15 may implement an API that may be used by one or more virtual arrays to access the underlying data. In an embodiment, a formatter may act as a facilitator between a virtual array 20 and the data storage 10. In an embodiment, there may be a type of a formatter object for each different data format. In another embodiment, one or more formatters may be compatible with multiple data formats. In yet another embodiment, there may be a single formatter object that is capable of accessing most of the needed data formats.

There may be one or more data structures 20 in workspace 18. Each of data structures 20 may represent one or more segments of data stored in storage 10. Data structures 20 may be variables, objects, built-in data types such as arrays, etc. In one embodiment, data structures 20 are virtual arrays as described above. A respective virtual array $20_{12}$, $20_{13}$, $20_{14}$ may be associated with each file and/or portions of files 12, 13, 14 being accessed. Although only three virtual arrays are illustrated in FIG. 1, the primary storage 19 may include, generally, one or more virtual arrays. In an object oriented approach, each of the virtual arrays $20_{12}$, $20_{13}$, $20_{14}$ may be thought of as an object. A virtual array 20 may contain various detailed information regarding the data from the data storage 10. Information may be loaded into the virtual array 20 from the operating system of the computer 16.

In an embodiment, there may be only one virtual array per file or per other storage data section (such as, for example, hard disk page, database table, etc.). In another embodiment, multiple virtual arrays may refer to the same data. In another embodiment, one virtual array may refer to data from different storage sections in the same file, for example, accessing different sections of data represented by different variables stored in the binary MATLAB® format by The MathWorks, Inc. of Natick, Mass. or to data from different files. In another embodiment, a single virtual array may refer to multiple other virtual arrays, or a single virtual array may be reassigned to represent different data. If the data being accessed through a virtual array includes only a portion of the file, then only the relevant portion may be loaded into memory, instead of loading the whole file into memory. In yet another embodiment, the requested data through a virtual array may be dynamically retrieved, that is, retrieved on an as needed basis, from the corresponding file (or other data source).

The data access interface through a virtual array may present different "views" of the stored data. That is, it may be wholly independent or different from the stored data format. For example, using virtual arrays, it may be possible to access in a seemingly sequential manner non-sequential file segments, and vice versa. In such a way, a virtual array is different from a file handle or other data access options conventionally used in programming languages, in that a virtual array may present a specialized interface, while a file handle only provides access directly to all of the file data as it has been read into memory in its entirety in exactly the same format it is stored on disk. Two or more virtual arrays associated with the same stored data may present different views into the underlying data.

Each virtual array 20 may include fields that store information about data that is not in primary storage, for example, one of files 12-14 in data storage 10. The virtual array 20 may include information regarding, for example: which file or data storage section the virtual array points to, a locator indicating the location within the file for the particular data, a mode indicating whether the file has been opened for reading, writing, etc., and other information. Some virtual arrays may also cache all or a portion of the underlying data accessible through those virtual arrays. Caching may be omitted or not exposed in the API in alternative embodiments. If particular data, for example, within the file 12 has been requested, the virtual array $20_{12}$ may retrieve the requested data from the data storage 10. The requested data may then be loaded into a corresponding field within the virtual array $20_{12}$. The data may be dynamically retrieved from the data storage 10—that is, retrieved on an as needed basis. In an embodiment, data modified through the virtual array may be written with delayed writes to the data storage 10.

With virtual arrays $20_{12}$, $20_{13}$, $20_{14}$, application 11 may be provided access to the data within a file 12, 13, 14. The data within the virtual array 20 may be mapped and indexed to the selected file. A user may operate on the data in the workspace 18 belonging to the application 11 and have the data stored in the data storage 10 be directly affected by the user's actions via the corresponding virtual array. A workspace may typically be associated with an application, and the data from the workspace may be stored in the primary storage.

As noted above, files 12-14 having different data sets, for example, different file types and file formats, may be stored in the data storage 10. In the past, a user desiring access to files 12-14 in data storage 10 was required to understand and remember the different functions applicable to the different file types and file formats. In contrast, exemplary embodiments may provide a uniform way of accessing different data types stored in the data storage 10. Exemplary embodiments may provide an application programming interface (API) that abstracts the underlying details regarding accessing the data stored in different file types and file formats. In one embodiment, a single API may be used to access data in multiple file types and file formats. In an alternative embodiment, a different API may be used for different file types and/or formats. In yet another embodiment, multiple APIs may be provided for a single file format, such that different APIs may be used in different applications and/or selected based on user preferences.

Figure 2:
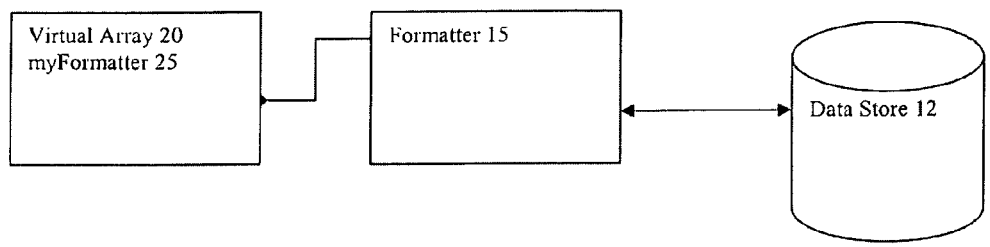
FIG. 2 depicts an exemplary relationship between a virtual array, a formatter and a data store.

FIG. 2 depicts an exemplary relationship between a virtual array 20, a formatter 15 and the data store 12. The virtual array 20 may have one or more formatter handles myFormatter 25 that are used to access the formatter 15. The virtual array 20 may not be connected directly to the data store 12. Instead, all data access to the data stored in the data store 12 may be accomplished through the formatter 15. The formatter 15 may be an object instantiated from a formatter class definition.

In an embodiment, there may be a base class definition of a formatter object, from which formatter objects 15 may be instantiated. There may be additional classes inheriting from the base class formatter definition to define data format specific formatters. Objects instantiated from the classes inheriting from the base formatter class must implement the interface of their parent formatter class.

Formatter 15 may be designed and provided by the same party as that providing the workspace environment, or it may be supplied by a third party. Formatter 15 may use other functions, objects, etc. to implement its functionality, as deemed appropriate by one of skill in the art.

Figure 3:
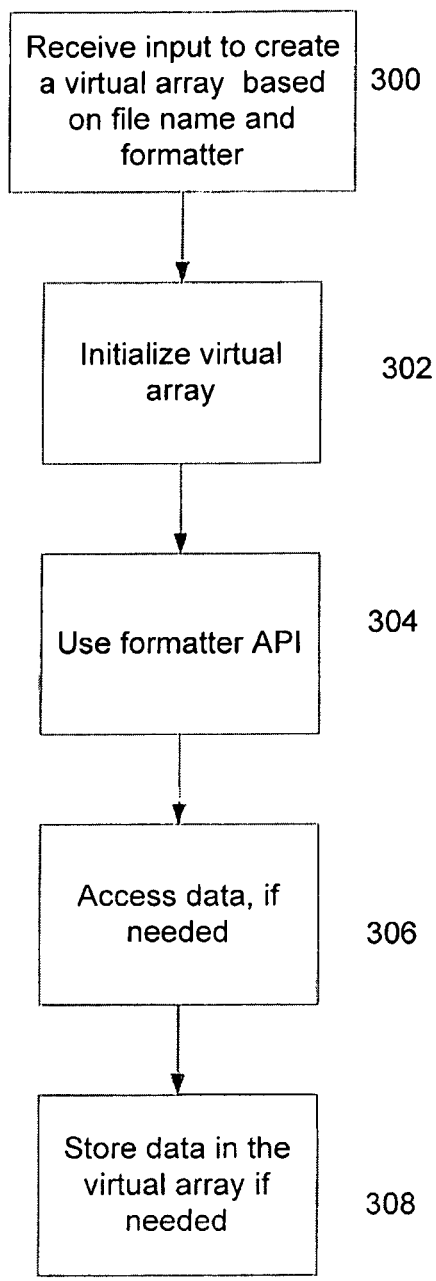
FIG. 3 depicts an exemplary flowchart showing processing according to an embodiment.

Referring now to FIG. 3, a method according to an embodiment is described. In an embodiment, an input may be received from a user and/or from an application or code to create/initialize a virtual array (300). The virtual array may be created (302) based on a file name of the file containing the data to which the virtual array will refer and the formatter to be used on that file. In an alternative embodiment, the formatter need not be specified and it may be automatically determined from the filename and/or from the format of the file to which the filename refers. In yet another embodiment, the filename and/or the formatter need not be explicitly specified in the instruction calling for the creation of the virtual array, but may be specified through other interfaces, such as, for example, through environment variables, pull down menus, additional user interfaces, etc. In an alternative embodiment, the filename may represent the name of the data set, such as a file name and extension, and a data request, which may be an identifier of the data within the file which is to be retrieved. For example, a file stored in the data storage 10 may have comma separated values including census information, such as name, address, age, etc. The application 11 may retrieve age information from this file. The age information may be stored in the third field of the file. In order to identify and retrieve the desired information, the name of the file, and an identifier for the desired data, which may be the field name, for example, 'age' may be provided.

The virtual array may use a formatter if one is provided. Also, a virtual array may create a formatter based on the data set information. The virtual array may, for example, identify the formatter based on the file extension (such as .jpeg), or by examining the file for characteristics that indicate a particular format.

FIG. 4A illustrates an exemplary definition 421 of a formatter base class. It may inherit from a handle base class (421); alternatively, it may be an ordinary class. The formatter definition 421 may have zero or more properties 422 and zero or more methods 428. In particular, illustrated are methods Rewind 430 for scrolling within the underlying data file; Close 432 for closing the file handle; Open 434 for opening the data source and returning an identifier for the underlying data source, etc. There may also be methods for writing data (440 and 442) and methods for reading data (436 and 438) based on an index or a range of indices.

As will be apparent to one of skill in the art, the definition of the formatter class need not be limited to what is illustrated in FIG. 4A. Different formatters may have different properties and methods, as appropriate for a particular environment. In an embodiment, a formatter may have methods, functions and/or sections of code to perform the following actions:

1) open and close one or more of a specific type of a data file
2) read a data region from that data file
3) write data to disk, and, in particular, write data to the specific type of the data file While formatters 15 are described as being objects instantiated from class definitions, their implementation need not necessarily be object-oriented. A function, a section of code, a structure, a third party interface, etc., may all serve as formatters, as designed by one of skill in the art. In yet another embodiment, the functionality of formatter 15 may be incorporated into the functionality of virtual array 20.

FIG. 4B illustrates an example formatter UniformBinaryFormatter 451 for accessing Binary data files. Its properties 452 may include RowSize 453 and Precision 454. The UniformBinaryFormatter 451 may implement the GetValue function 438 as shown (455). It may also implement additional functions and/or methods.

In an embodiment, there may be multiple formatters capable of accessing the same data format. For example, there may be one or more different formatters capable of accessing binary data files. A user may be able to pick which formatter to use when creating a virtual array. Alternatively, an appropriate formatter may be selected automatically based on the type of the file located in the data store 12 at the link pointed to by the provided file name.

FIG. 5 is an example definition of a virtual array 20 class VArray 501. The virtual array interface may expose to the user the instructions for creating the VArray 501, and accessing and modifying the associated data via an indexing API. The VArray 501 may translate data access presented to it via the indexing API into the appropriate calls to the formatter API. The VArray 501 may also have methods for determining the size of the underlying data or other characteristics of the underlying data, such as, for example, data format, etc.

The virtual array 20 class VArray 501 may inherit from a handle base class. It may have zero or more properties 502, such as, for example, Filename 504. The property Filename 504 may store the name or a link to the file containing the data to which the VArray 501 is providing access. The VArray 501 may also have a FileID property 506 storing the identifier for the opened data source.

The VArray 501 definition may have one or more methods 508, such methods for initiating the MyFormatter object 25 (510) and for reading and writing data based on an index or indices (514 and 516). There may also be methods for managing the memory storing the objects, such as the method for deleting the object (518). In an embodiment, the lifecycle of the VArray 501 may be managed by the programming environment, without explicit calls to a destructor by the user. The appropriate cleanup methods on the formatter object may be invoked when the VArray 501 is destroyed either explicitly by the user or implicitly by the programming environment or an application in the programming environment.

VArray 501 may allow the user to manipulate the data stored in secondary storage using indexing by invoking the appropriate methods on the formatter object. The VArray 501 may communicate with the formatter using the formatter API. The formatter API may be agnostic as to the type of the data file with which the VArray 501 is associated.

The code using virtual arrays may be written in an array based language. An array based language is a language having one or more data types specifically designed to handle matrix or vector or array manipulations. An array may be a basic data unit used to represent data in the array based language. An array may be of zero and more dimensions. For example, an array based language may be a language a subset of which is executable in the MATLAB® programming environment. In an alternative embodiment, the programming language need not be array based, and may be a custom-designed language or any of the commonly used languages, such as C, C++, Java, Perl, Python, Visual Basic, etc. The virtual array interface may be provided by an integrated development environment (IDE), by the mechanisms built-in into a programming language, by a particular compiling/executing environment, etc.

In an embodiment, the virtual array API may allow indexing into a data set, similar to indexing into a regular array. In such a way, users may be able to index into any section of a file, similar to the way they may be able to index into arrays stored in memory. The virtual array data structure may be optimized for different types of accesses, as determined by one of skill in the art. The virtual array data structure layout may be provided by a toolbox used in conjunction with a computing environment or by the computing environment.

Virtual arrays may be a convenient way for users to access data files, as compared to the conventional methods of opening a file stored in the secondary storage. A conventional way of accessing data on disk may be cumbersome and require many steps. For example, below is a section of code that may be needed to perform certain data manipulations using the conventional file I/O API:

```
% Open file for reading and writing
fid=fopen('myfile.bin', 'r+');
% Skip 1024 bytes==128 doubles
fseek(fid, 128*8, -1);
% read 512 doubles
data=fread(fid, 512, '*double');
% Transform the data
data=sqrt(2*data+1);
% Seek to same position again
fseek(fid, 1024, -1);
% Write out the transformed data
fwrite(fid, '*double', data);
% close file
fclose(fid);
```

Without the use of explicit comments, this code may be difficult to understand. It is somewhat lengthy and also may require some amount of bookkeeping by the user to access and modify the data. A corresponding section of code using VArray 501 may read as follows (note: this code is for illustration purposes only, and it may be written in a variety of different ways):

```
v=VArray('myfile.bin', BinaryFormatter('double'));
data=v(128+1:128+512); %←access/reference
data=sqrt(2*data+1);
v(128+1:128+512)=data; %←modification
```

The code written using the virtual array API may be shorter and easier for a user to understand. It may also reduce complexity associated with file I/O by providing a uniform access to data on a storage device and/or by providing an indexing API into multiple file that are not conventionally indexable into.

In another example, a file in the binary MATLAB® programming environment format by The MathWorks, Inc. of Natick, Mass. may be used as a data store. To access a variable "x" stored in the file, a user may use the following commands:

```
V=VArray(matFile, matFileFormatter);
Data=V.x(101:151, 101:151);
V.x(101:151, 101:151)=sqrt(Data);
```

Note that in the above example, multiple levels of indexing into the VArray are used to access and modify the selected data subset in the file.

Users may also use VArrays when processing large documents or opening datasets which may require large memory allocations. In such cases, it may be convenient for a user to be able to use processing commands that process a section of the data at a time. Conventional ways of opening files may not allow for such block processing or partial processing. In comparison, a VArray 501 may be used to both gain a convenient way of indexing into the dataset and to be able to process only a subset of the dataset at a time.

In an embodiment, the format information may be specified in a functional form. For example, large image files are common in image data processing applications and it may be more convenient to process the data without loading the entirety of the files into memory. In such cases, virtual arrays may be used to read and manipulate data. For example, in order to access data for reading, a user may use the following commands:

```
B=VArray('bigdata.hdf', 'hdfsd', 'read');
A=B(10001:10050, 20001:20050);
```

The above two lines first initialize a VArray 501 called "B." The file from which data is to be read is called "bigdata.hdf", "hdfsd" specifies HDF binary format data, and the file is to be opened for reading. As can be seen, in an embodiment, there may be additional arguments provided to the VArray 501 and/or to the formatter to indicate the type of operations to be performed on data. This section of code reads in a fifty-by-fifty block of data from the file bigdata.hdf and assigns it to array "A."

Virtual arrays may be used in the process of copying or moving data from one section of memory and/or secondary storage to another and/or in the process of creating data. Data from one file may be stored and/or referenced by a virtual array and may then be processed and stored in another file.

For example, the following section of code illustrates applying a smoothing filter to an image. The processing may involve block processing. Block processing may be accomplished by using a function capable of working with blocks and/or with overlapping blocks. Such function may be a "blockproc" function of the MATLAB programming environment.

fa_in=VArray('bigfile1.tif','tif','read');
fa_out=VArray('bigfile2.tif';'tif','create', 'grayscale', size(fa_in),'uint8');
blocksize=bestblock(fa_in,1e5);
bordersize=[2 2];
h=fspecial('gaussian',5);
blockproc(fa_in,fa_out,blocksize,bordersize, @(x) imfilter(x, h));

The initial data is in VArray "fa_in" and the output is stored and written to the disk using the VArray "fa_out." In order to write out the changed data to disk, a new file may be created on disk, as is illustrated above with the file "bigfile2.tif."

Block processing may be useful with very large files or operations involving large sets of data. For block processing, the block size may be set by a user. In an alternative embodiment, a formatter and/or a virtual array used may suggest a block size to use. Such block size suggestion may be based on the format of the underlying data and/or on memory considerations. In yet another embodiment, a virtual array and/or formatter may provide additional information about the underlying data.

As illustrated above, virtual arrays may be used in data access and/or data creation and modifications. Data created during the course of processing may be written to a virtual array to be then written out to disk, or it may stay solely in memory, as appropriate for a particular implementation and a particular use of virtual arrays. In general, use of the VArrays may involve interaction between a processing device, such as a processor, a primary storage device, such as a cache or a memory device, and a secondary storage device, such as, for example, a hard disk.

Figure 6:
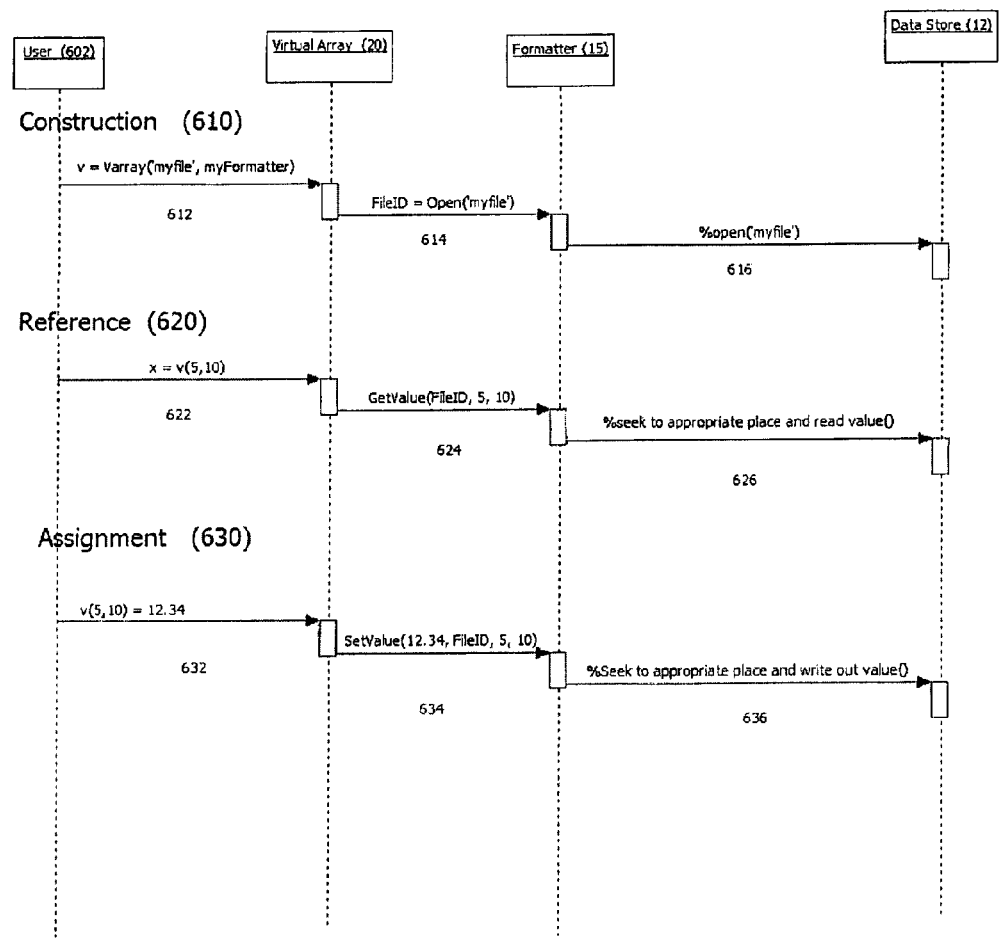
FIG. 6 depicts an example of sequence of actions performed by a formatter, a virtual array and a data store.

FIG. 6. Depicts a schematic diagram of interactions between the user code 602, the virtual array 20, the formatter 15 and the data store 12. For example, on creating a virtual array (610), the user code 602 may call an instruction 612:

v=VArray('myfile', myFormatter)

The virtual array 20 may in turn call a method on the formatter (614):

FileId=Open(myFormatter, 'myfile')

The formatter may then make a procedure call 616 to open the underlying file:

open('myfile')

In accessing data in the virtual array, the user may use indexing API to reference into the virtual array (622). For example:

x=v(5,10)

The virtual array may then call an appropriate method on the formatter (624):

GetValue(myFormatter, FileID, 5,10)

And, the formatter may seek to the appropriate place in the file and read the appropriate values (626). Similar actions are taken in response to an assignment operation 630, where the user calls a command using the virtual array indexing API (632), the virtual array calls a method of the formatter (634), and the formatter seeks to the appropriate place in the file and writes out the value (636). The writing out may be delayed, if necessary. The specifics of data access on the secondary storage may vary greatly from implementation to implementation, as implemented by one of skill in the art. The implementation of the virtual arrays and formatters need not be object oriented, and in an alternative embodiment, the functionality of the virtual arrays and the formatters may be combined into one object and/or procedure.

Figure 7:
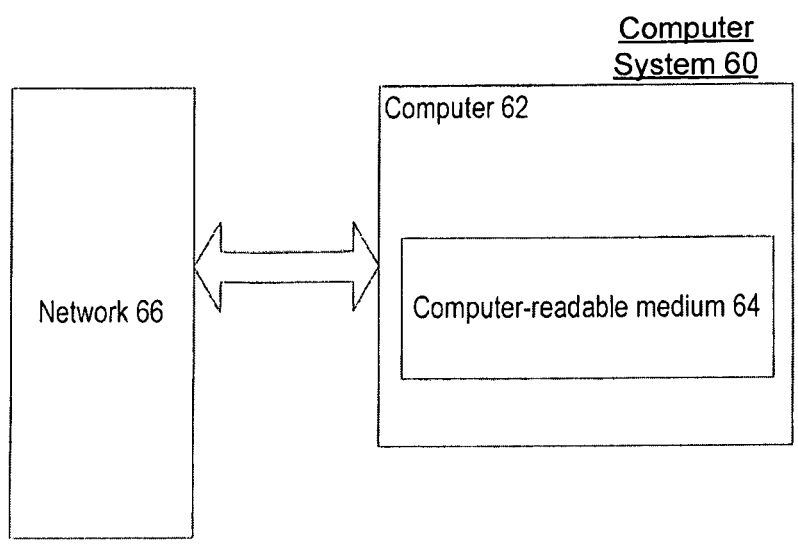
FIG. 7 depicts a computer system for use with exemplary embodiments.

FIG. 7 depicts a computer system for use with embodiments. The computer system 60 may include a computer 62 for implementing the invention. The computer 62 may include a computer-readable medium 64 embodying software for implementing the invention and/or software to operate the computer 64 in accordance with the invention. As an option, the computer system 60 may include a connection to a network 66. With this option, the computer 62 may be able to send and receive information (e.g., software, data, documents) from other computer systems via the network 66.

Exemplary embodiments of the invention may be embodied in many different ways as a software component. For example, it may be a stand-alone software package, or it may be a software package incorporated as a "tool" in a larger software product, such as, for example, a mathematical analysis product or a statistical analysis product. It may be downloadable from a network, for example, a website, as a stand-alone product or as an add-in package for installation in an existing software application. It may also be available as a client-server software application, or as a web-enabled software application.

Figure 8:
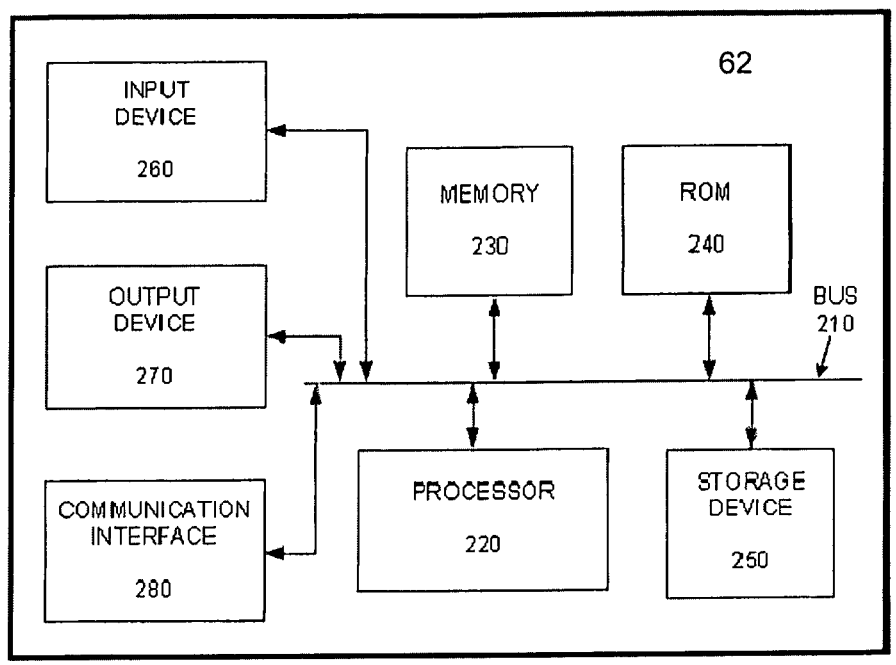
FIG. 8 depicts an exemplary architecture for the computer of FIG. 7.

FIG. 8 illustrates an exemplary architecture for implementing computer 62 of FIG. 6. It will be appreciated that other devices that can be used with the computer 62, such as a client or a server, may be similarly configured. As illustrated in FIG. 7, computer 62 may include a bus 210, a processor 220, a memory 230, a read only memory (ROM) 240, a storage device 250, an input device 260, an output device 270, and a communication interface 280.

Bus 210 may include one or more interconnects that permit communication among the components of computer 62. Processor 220 may include any type of processor, microprocessor, or processing logic that may interpret and execute instructions (e.g., a field programmable gate array (FPGA)). Processor 220 may include a single device (e.g., a single core) and/or a group of devices (e.g., multi-core). Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a ROM device and/or another type of static storage device that may store static information and instructions for processor 220. Storage device 250 may include a magnetic disk and/or optical disk and its corresponding drive for storing information and/or instructions. Storage device 250 may include a single storage device or multiple storage devices, such as multiple storage devices operating in parallel. Moreover, storage device 250 may reside locally on computer 62 and/or may be remote with respect to computer 62 and connected thereto via a network and/or another type of connection, such as a dedicated link or channel.

Input device 260 may include any mechanism or combination of mechanisms that permit an operator to input information to computer 62, such as a keyboard, a mouse, a touch sensitive display device, a microphone, a pen-based pointing device, and/or a biometric input device, such as a voice recognition device and/or a finger print scanning device. Output device 270 may include any mechanism or combination of mechanisms that outputs information to the operator, including a display, a printer, a speaker, etc.

Communication interface 280 may include any transceiver-like mechanism that enables computer 62 to communicate with other devices and/or systems, such as a client, a server, a license manager, a vendor, etc. For example, communication interface 280 may include one or more interfaces, such as a first interface coupled to a network and/or a second interface coupled to a license manager. Alternatively, communication interface 280 may include other mechanisms (e.g., a wireless interface) for communicating via a network, such as a wireless network. In one implementation, communication interface 280 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computer 62 may perform certain functions in response to processor 220 executing software instructions contained in a computer-readable medium, such as memory 230. In alternative embodiments, hardwired circuitry may be used in place of or in combination with software instructions to implement features consistent with principles of the invention. Thus, implementations consistent with principles of the invention are not limited to any specific combination of hardware circuitry and software.

All examples discussed herein are non-limiting examples.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 3, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1-2, and 6-8 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A non-transitory computer-readable medium comprising instructions for accessing data on a secondary storage, the instructions executable by a processor connected to a primary storage and to the secondary storage, the computer-readable medium comprising:

instructions for receiving a first file identifier for a first file stored in the secondary storage, the first file associated with a first file type and holding the data in one or more first data elements;

instructions for receiving a second file identifier for a second file stored in the secondary storage, the second file associated with a second file type and holding the data in one or more second data elements;

instructions for accessing the first file and the second file stored on the second storage;

instructions for creating a data structure in the primary storage, the data structure representing a plurality of non-sequential segments of the data from the first file and the second file, the data from the first file and the second file being stored non-sequentially in the secondary storage, the plurality of non-sequential segments including file content data, the data structure providing sequential access to the plurality of non-sequential segments of the data from the first file and the second file;

instructions for creating a formatter object based on the first file type and the second file type, the formatter object accessing the file content data stored in the secondary storage based on the first file type and the second file type and facilitating file content data transfer between the first file, the second file, and the data structure;

instructions for receiving user input, the user input representative of a user action and including a first command of a first application programming interface (API), the first command accessing the one or more first data elements of the first file and the one or more second data elements of the second file by indexing into the data structure, the first API being in an array-based programming language;

instructions for transforming the user input into a second command of a second application programming interface (API), the second command of the second API being directed at the secondary storage; and instructions for accessing the one or more first data elements of the first file and the one or more second data elements of the second file stored in the secondary storage using the second command of the second API, the one or more accessed first data elements and the one or more accessed second data elements including file content data being dynamically retrievable on an as needed basis.

2. The non-transitory computer-readable medium of claim 1, wherein instructions for transforming the user input into the second command further comprise:

instructions for transforming the first command of the first API into a third command of a third application programming interface (API); and instructions for transforming the third command of the third API into the second command of the second API.

3. The non-transitory computer-readable medium of claim 2, wherein instructions for transforming the third command of the third API into the second command of the second API further comprise:

instructions for calling a procedure of the formatter object.

4. The non-transitory computer-readable medium of claim 1, wherein the first API is an object oriented API supported by an object oriented programming language.

5. The non-transitory computer-readable medium of claim 1, wherein the programming language is one or a combination of: FORTRAN 90, C, C++, Java, Perl, NumPy, or Visual Basic.

6. The non-transitory computer-readable medium of claim 1, wherein the programming language is a subset of instructions executable in the MATLAB computing environment.

7. The non-transitory computer-readable medium of claim 1, wherein the instructions for creating the data structure further comprise instructions for receiving from the user a second command of the first API.

8. The non-transitory computer-readable medium of claim 7, wherein the second command of the first API comprises at least one of: "VArray," "VirtualArray," "VirtualWorkspace," or "VWorkspace."

9. The non-transitory computer-readable medium of claim 8, wherein the second command of the first API further comprises the identifier of the first file and a designation of a formatter type.

10. The non-transitory computer-readable medium of claim 1, wherein the first command of the first API comprises an open parenthesis, indication of a first element, colon, indication of a second element and a close parenthesis.

11. The non-transitory computer-readable medium of claim 1, wherein the second command of the second API comprises a file I/O command and wherein the first file is in a binary format.

12. The non-transitory computer-readable medium of claim 1, wherein indexing comprises hierarchical indexing.

13. The non-transitory computer-readable medium of claim 11, wherein the binary format is an image format and is at least one of the following formats: GIF, JPEG, TIFF, raw, or HDF.

14. The non-transitory computer-readable medium of claim 1, wherein the formatter object seeks a first specified location within the first file and a second specified location in the second file to write data from the data structure into the first file and the second file.

15. A computer-executable method of providing an application program interface (API) for accessing data on secondary storage, the secondary storage being connected to a primary storage and a processor, said method comprising:
providing a user interface on a computing device for receiving user input in an array-based language, the user interface for indicating a first file and a second file stored on the secondary storage of the computing device;
accessing the first file stored on the secondary storage of the computing device, the first file associated with a first file type and holding content data;
accessing the second file stored on the secondary storage of the computing device, the second file associated with a second file type and holding content data;
storing, in the primary storage of the computing device, in response to the user input, a data structure representing at least a subset of the first file and the second file stored on the secondary storage, the data structure storing non-sequential content data of the first file and the second file;
creating, in the primary storage of the computing device, a formatter object based on the first file type and the second file type, the formatter object accessing the file content data stored in the secondary storage based on the first file type and the second file type and facilitating file content data transfer between the first file, the second file, and the data structure;
receiving, through the user interface on the computing device, one or more first commands of a first application programming interface (API) for accessing the first file and the second file, the one or more first commands comprising one or more indexes into the first file or the second file, the first API being an array-based language;
executing, in response to receiving the one or more first commands comprising the one or more indexes into the first file or the second file, one or more second commands of a second application programming interface (API) to perform file I/O on the first file or the second file stored on the secondary storage, including file content data being dynamically retrievable on an as needed basis; and
storing the results of executing the second command to perform file I/O on the first file or the second file stored on the secondary storage.

16. The computer-executable method of claim 15, wherein the data structure representing at least a subset of the first file or second file stored on the secondary storage is a first object, and wherein executing the one or more second commands further comprises executing, by the first object, a method of a second object.

17. The computer-executable method of claim 16, wherein the second object is the formatter object.

18. The computer-executable method of claim 17, wherein the formatter object is an instance of a class deriving from a formatter base class.

19. The computer-executable method of claim 15, wherein the one or more first commands comprising the one or more indexes into the first or second file are in an array-based language.

20. The computer-executable method of claim 19, wherein the array-based language is a language compatible with the MATLAB programming environment.

21. The computer-executable method of claim 17, wherein the one or more first commands comprises a command to modify at least one element of the data structure and the one or more second commands comprises a file I/O command to modify at least one element of the first or second file stored on secondary storage.

22. The computer-executable method of claim 15, wherein the first file comprises an image file and wherein the one or more indexes into the first file comprises an index identifying a region of the image file.

23. The computer-executable method of claim 22, further comprising:
suggesting, by the formatter object, a size of the region of the image file.

24. The computer-executable method of claim 15, further comprising:
receiving a third command from the user; and
storing, in response to receiving the second command, a third command to create a new file on the secondary storage.

25. A device for accessing one or more files on a computer-readable medium, the device comprising:
a memory containing a data structure corresponding to one or more non-sequential segments of data elements from a first file and a second file stored on the computer-readable medium, the one or more non-sequential segments including file content data, the data structure providing sequential access to the plurality of non-sequential segments of the data from the first file and second file; and
a processor for:
receiving a first file identifier for the first file and a second file identifier for the second file stored on the computer-readable medium, the first file having a first file type and the second file having a second file type;
accessing the first file and the second file stored on the computer-readable medium;
creating the data structure;

creating a formatter object based on the first file type and the second file type, the formatter object accessing the file content data stored in the secondary storage based on the first file type and the second file type and facilitating file content data transfer between the first file, the second file, and the file structure;

receiving a modification instruction requesting modification of one or more data elements in the first file or the second file, including a first command of a first application programming interface (API), the first command accessing the one or more first data elements of the first file and the one or more second data elements of the second file by indexing into the data structure, the first API being an array-based programming language;

transforming the instruction into a second command of a second application programming interface (API), the second command of the second API being directed at the computer-readable medium; and accessing the one or more first data elements of the first file and the one or more second data elements of the second file stored in the computer-readable medium using the second command of the second API, the one or more accessed first data elements and the one or more accessed second data elements including file content being dynamically retrievable on an as needed basis.

26. A computer-implemented system for accessing a dataset stored on hard disk, said system comprising:

a processor to:
    interact with a memory, and
    interact with the hard disk;

a dataset stored on the hard disk, the dataset represented as a first file with a first file type and a second file with a second file type, wherein the processor receives one or more identifiers for the dataset stored on the hard disk;

a data structure in the memory corresponding to one or more non-sequential segments of the data from the dataset stored on the hard disk, the contents of the data structure being different form the entirety of the dataset contents, the one or more non-sequential segments include file content data, the data structure providing sequential access to the plurality of non-sequential segments of the data from the dataset stored on the hard disk;

a formatter object in the memory corresponding to the first file type and the second file type, the formatter object accessing the file content data stored in the secondary storage based on the first file type and the second file type and facilitating file content data transfer between the dataset and the data structure; and one or more application program interfaces (APIs) to:
    modify one or more elements in the dataset based on an indexing instruction into the data structure in memory; and instructions stored in the memory and executed by the processor to:

receive a first file identifier for the first file stored in the hard disk, the first file holding data in one or more first data elements;

receive a second file identifier for the second file stored in the hard disk, the second file holding the data in one or more second data elements;

access the first file and the second file stored on the hard disk;

create the data structure in the memory;

create the formatter object;

receive user input, the user input representative of a user action and including a first command of a first application programming interface (API), the first command accessing the one or more first data elements of the first file and the one or more second data elements of the second file by indexing into the data structure, the first API being an array-based programming language;

transform the user input into a second command of a second application programming interface (API), the second command of the second API being directed at the hard disk; and access the one or more first data elements of the first file and the one or more second data elements of the second file stored in the hard disk using the second command of the second API, the one or more accessed first data elements and the one or more accessed second data elements including file content data being dynamically retrievable on an as needed basis.

* * * * *

UNITED STATES PATENT AND TRADEMARK OFFICE
CERTIFICATE OF CORRECTION

| | | |
|---|---|---|
| PATENT NO. | : 8,751,480 B1 | Page 1 of 1 |
| APPLICATION NO. | : 12/363236 | |
| DATED | : June 10, 2014 | |
| INVENTOR(S) | : Nausheen B. Moulana et al. | |

It is certified that error appears in the above-identified patent and that said Letters Patent is hereby corrected as shown below:

In the Claims:

At Claim 26, column 17, line 37, replace "form" with --from--.

At Claim 26, column 17, line 39, replace "include" with --including--.

Signed and Sealed this
Twenty-third Day of December, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,751,480 B1 | Page 1 of 1 |
| APPLICATION NO. | : 12/363236 | |
| DATED | : June 10, 2014 | |
| INVENTOR(S) | : Moulana et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1018 days.

Signed and Sealed this
Fifteenth Day of September, 2015

Michelle K. Lee
*Director of the United States Patent and Trademark Office*